UNITED STATES PATENT OFFICE.

HARRY T. BELLAMY, OF OAK PARK, AND BURTON T. SWEELY, OF CICERO, ILLINOIS, ASSIGNORS TO WESTERN ELECTRIC COMPANY, INCORPORATED, OF NEW YORK, N. Y., A CORPORATION OF NEW YORK.

GLASS COMPOSITION.

1,415,980.   Specification of Letters Patent.   Patented May 16, 1922.

No Drawing. Original application filed November 16, 1918, Serial No. 262,852. Divided and this application filed March 20, 1920. Serial No. 367,395.

*To all whom it may concern:*

Be it known that we, HARRY T. BELLAMY and BURTON T. SWEELY, citizens of the United States, residing at Oak Park, in the county of Cook and State of Illinois, and at Cicero, in the county of Cook and State of Illinois, respectively, have invented certain new and useful Improvements in Glass Compositions, of which the following is a full, clear, concise, and exact description.

This invention relates to glass compositions, and more particularly to glass compositions which are particularly adapted for use as binders in high resistance compounds.

In all artificially compounded porcelains and similar silicates as well as the natural occurring silicates such as clays, etc., which are used at the present time as insulators in electrical heating elements, a sharp decrease in resistance occurs with increase in temperature within certain limits. This is due to the fact that certain substances have the peculiar property of conducting electricity and acting as electrolytes when a silicate body containing them is raised in temperature, the activity being more pronounced upon increasing either the temperature or amount of electrolyte present.

It has been found that by combining certain elements such as talc, silica sand, and ball clay with a suitable binder, a compound can be produced which will have a high resistance at high temperatures on account of being practically free from electrolytic action, and will be capable of being readily formed or worked into any desired shape. Such a compound is described and claimed in an allowed application of these inventors, Serial No. 262,852, filed November 16, 1918, of which this application is a division.

It is the purpose of this invention to produce a glass binder having non-electrolytic characteristics and which may be readily used with the other elements constituting the body of the resistance to produce a workable and permanent article.

In accordance with this invention, the glass binder is composed of substances which do not become electrolytically active at the temperatures at which a resistance element of this class is worked. These substances are the silicates and borates of calcium and barium in combination with alumina. The amounts of these several substances which produce a binder which satisfactorily meets the requirements are

|                  | Per cent. |
|------------------|-----------|
| Whiting          | 10.5      |
| Barium carbonate | 20.7      |
| Clay             | 2.7       |
| Boric acid       | 52.2      |
| Quartz           | 13.9      |

The above composition when melted to a glass is practically non-conducting up to a temperature of approximately 1300° Fahrenheit.

The glass above described when combined with highly refractory materials, such as the powdered talc, quartz sand, and clay entering into the composition of the resistance element, acts in an entirely different manner from that of the usual fluxes in artificially compounded silicates. The resulting degree of hardness and strength of the finished body when the usual fluxes such as feldspar, whiting, etc., are used, is directly proportional to the temperature at which the eutectic mixture between the various components forms, the length of time necessary to form sufficient of these eutectic mixtures to bond the body, and the length of time over which the body is subjected to heat treatment. In the case of the glass binder of this invention the eutectic relation has practically no effect, and if sufficient heat treatment to melt the glass is accorded, the resultant body will be as hard and strong as the glass since it fuses around and cements together the different refractory components of the body and does not depend upon partial fusion of these components to create the bond.

What is claimed is:

1. A binder for high resistance compositions, comprising a non-electrolytic glass composed of silicates and borates of calcium and barium.

2. A batch for non-electrolitic glass, comprising whiting, barium carbonate, clay, boric acid, and quartz.

3. A batch for non-electrolytic glass, comprising approximately ten per cent whiting, twenty-one per cent barium carbonate, three per cent clay, fifty-two per cent boric acid, and fourteen per cent quartz.

In witness whereof, we hereunto subscribe our names this first day of March, A. D. 1920.

HARRY T. BELLAMY.
BURTON T. SWEELY.